Jan. 24, 1961 J. J. GREBE 2,969,313
NUCLEAR REACTOR
Original Filed Oct. 3, 1949

INVENTOR.
John J. Grebe
BY
ATTORNEY

United States Patent Office

2,969,313
Patented Jan. 24, 1961

2,969,313

NUCLEAR REACTOR

John J. Grebe, Midland, Mich., assignor to the United States of America as represented by the United States Atomic Energy Commission Original application Oct. 3, 1949, Ser. No. 119,228, now Patent No. 2,917,443, dated Dec. 15, 1959. Divided and this application Aug. 26, 1959, Ser. No. 838,013

1 Claim. (Cl. 204—193.2)

This invention relates generally to the nuclear reactor art and is particularly concerned with reactors of novel design which are uniquely adapted to serve as the heat source for nuclear powered aircraft or rockets, although not necessarily being limited to such use. This application constitutes a divisional application of my co-pending application, Serial No. 119,228, filed October 3, 1949, now Patent No. 2,917,443, issued December 15, 1959.

As is now well known, by massing together sufficient fissionable material under appropriate conditions, a neutron reactive system may be formed, which system, by reason of its ability to generate neutrons at an equal or greater rate than they are being lost to the system as a result of absorption in the system or leakage from the system, is capable of maintaining a self-sustained chain reaction of neutron induced fission. Such a system has been termed a nuclear reactor, or "pile." Since the general principles of design, operation, and control of such reactors have now been well publicized in the literature, a knowledge of such general principles will be assumed in what follows. Reference is made particularly to "The Science and Engineering of Nuclear Power," Addison-Wesley Press, Inc., Cambridge, Massachusetts, vol. I (1947), and vol II (1949).

Ever since the initial demonstration of a successful, self-sustaining neutron chain reaction, it has been widely recognized that a nuclear powered aircraft would represent a marked advance in the aircraft field and would open up possibilities in the field of flight which are not possible with chemically powered aircraft. It is well known that for chemically powered aircraft, there is a theoretical relationship between the theoretically attainable values of flight speed and flight range, which relationship places an upper limit on the range attainable at a given speed or the speed attainable for a given range. In particular, the range of chemically powered aircraft at speeds in the upper subsonic or in the supersonic regions is extremely limited. It can be shown theoretically that nuclear powered aircraft would not be subject to this limitation at all, the range being substantially independent of the speed. Accordingly, nuclear powered aircraft open up the possibility of flight at upper subsonic and supersonic speeds with an unlimited range.

With regard to rockets, the utilization of a nuclear reactor as the heat source permits the use of a low molecular weight gas, such as hydrogen, as the thrust producing medium. Chemically powered rockets, of course, must rely on the relatively high molecular weight gaseous combustion products of the fuel used as the thrust producing medium. The molecular weight of the combustion products of commonly used rocket fuels is about 22. Since the thrust per pound of fuel varies inversely in accordance with the square root of the molecular weight of the thrust producing gas, it is immediately apparent that a nuclear powered rocket using hydrogen as the working fluid would have a specific impulse many times higher than that obtainable with any chemically powered rocket. Since the actual value of specific impulse which might be obtained in this way is comparable to the value theoretically necessary in order to overcome the earth's gravitational field, the realization of an "escape" rocket for use in inter-planetary travel, or as a man made satellite, becomes for the first time a real possibility.

Insofar as the power plant as a whole is concerned, the basic design of a nuclear powered jet aircraft or rocket involves merely the substitution of a nuclear reactor for the combustion chamber of a conventional chemically powered jet aircraft or rocket. However, the design of a nuclear reactor which is suitable for this application represents a serious and specialized problem. It will readily be apparent that such a reactor must satisfy stringent requirements as regards size; weight; operating temperature; uranium inventory; and, most particularly, heat transfer characteristics.

Accordingly, it is the broad object of the present invention to provide a nuclear reactor which is particularly adapted for use as the heat source of a rocket or a jet aircraft.

Another object of the invention is to provide a nuclear reactor characterized by the ability to transfer large amounts of heat very quickly to the traversing coolant or working fluid.

A further object of the invention is to provide a nuclear reactor wherein the over-all volume devoted to coolant gas passageways is small in relation to the rate of heat removal from the reactor.

Applicant accomplishes these objectives by providing a special arrangement of coolant gas passageways through the nuclear reactor whereby the working fluid enters and emerges from the reactor by way of relatively large inwardly tapered headers or ducts which project into the reactor from opposite ends thereof. These gas inlet ducts and gas outlet ducts do not themselves connect together at the interior of the reactor but rather are separated from each other by the active material of the reactor. This active material is provided with a great many small diameter bores or capillary tubes through which the coolant gas may flow in parallel from inlet to outlet ducts. Preferably, instead of actually forming a large number of these bores as discrete individual passageways through the active material, the active material itself is fabricated initially as a porous gas permeable mass.

Figure 2:
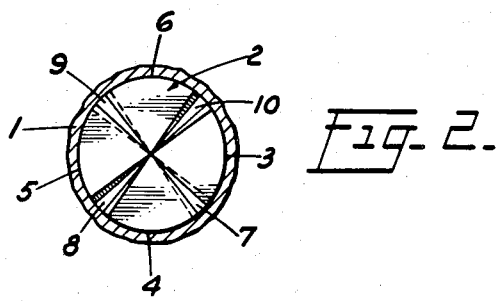
Fig. 2 is an end view of Fig. 1 taken from the left.
Figure 1:
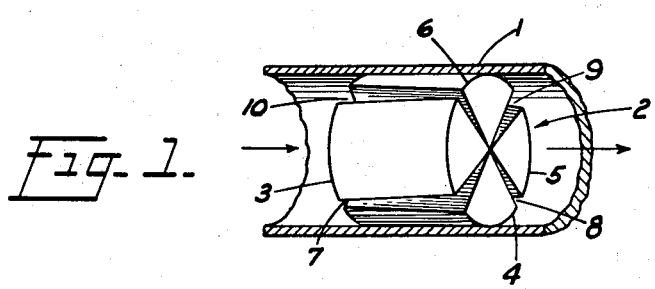
Fig. 1 is an elevation view, partially broken away, of a nuclear reactor illustrating the principles of the present invention.

Referring now to Figs. 1 and 2, reference numeral 1 designates a tubular heat resistant casing which provides the coolant gas passageway to and away from the nuclear reactor 2 which acts as the heat source for the rocket or jet aircraft. Thus, it is to be understood that casing 1 terminates at its left end at the source of the working fluid and at its right end in a jet nozzle. In the case of jet aircraft, of course, the working fluid would be the air which is scooped in by the diffuser of the jet aircraft. In the case of a rocket, the working fluid would preferably be hydrogen gas which is permitted to vaporize from a liquid hydrogen storage tank. as shown, the casing 1 surrounds and encompasses the nuclear reactor 2.

The nuclear reactor 2 has the general shape of a right circular cylinder the axis of which is centrally aligned within the casing 1. As it is illustrated in the drawings, the reactor is provided with neither a radiation shield nor a neutron reflector, although either or both of these features might be provided depending upon the particular application. Accordingly, in the case illustrated, the entire reactor forms a core or active portion, that is, it is formed entirely of an active material containing fissionable nuclei, such as U-233, U-235 or Pu-239. The active material also contains low atomic weight elements such as hydrogen, beryllium, lithium, or carbon, in elemental or compound form, these elements acting simultaneously as diluents for the fissionable nuclei and as moderators to slow down the fission neutrons. Preferably, the active material is fabricated as a porous or gas permeable material, that is, the material is interlaced in a random manner with very small interconnecting bores or capillary tubes. Forty percent porosity of the active material can be readily obtained by conventional metallurgical techniques. An equivalent effect can be obtained, if desired, by packing together small balls or pellets of non-porous active material. Of course, the active material must be one which will withstand the high temperature of operation. Uranium carbide, for example, would be suitable for use as the porous active material. Other suitable materials would be lithium hydride, beryllium hydride, beryllium carbide, or graphite, all of these being impregnated with plutonium or with uranium enriched in the 235 isotope.

The entire reactor is split up into a plurality of angularly spaced sector shaped segments. These segments are shown in the drawings as four in number and are designated by reference numerals 3, 4, 5, and 6, respectively. As shown, consecutive ones of these sector shaped segments are tilted in opposite directions relative to the reactor axis. In this manner, the wedge shaped openings 8 and 10 which are formed between segments 4 and 5, and 3 and 6, respectively, are widened at their left side and shortened at their right side, and the wedge shaped openings 7 and 9 which are formed between segments 3 and 4, and 5 and 6, respectively, are shortened at their left side and widened at their right side. Openings 8 and 10 thus form inwardly converging tapered inlet headers or ducts for the incoming cold gas, and openings 7 and 9 form outwardly diverging tapered outlet headers or ducts from which the hot gas emerges. Coolant gas entering duct 10 flows through the capillary tubes of segments 3 or 6 and emerges by way of outlet ducts 7 or 9. Similarly, coolant gas entering duct 8 flows through the capillary tubes of segments 4 or 5 and emerges by way of outlet ducts 7 or 9.

Figure 3:
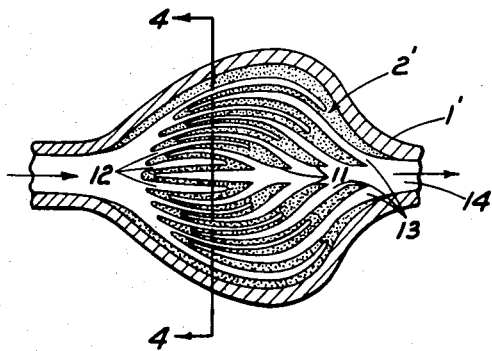
Fig. 3 is a sectional elevation view of a modified form of the present invention.
Figure 4:
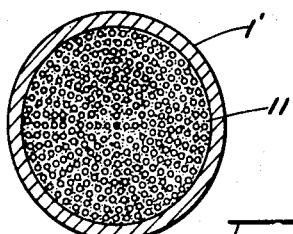
Fig. 4 is a cross section taken along the lines 4—4 of Fig. 3.

Referring now to Figs. 3 and 4, wherein there is shown a form of the invention particularly adapted for use as the energy producing unit of an escape rocket, reference numeral 1' represents a heat resistant casing similar to casing 1 of Fig. 1. In this instance, however, casing 1' has a bulbous portion which conforms to the generally spherically shaped nuclear reactor 2'. The reactor 2' can best be visualized as being formed of a plurality of hollow tapered tubular segments 11 of the porous active material, said segments being arranged side by side in all radial directions from the axis of the reactor. At the right end each segment converges to a close, while at the left open end each segment is joined to the adjacent segments. The hollow interior of the various segments thus form tapered inlet ducts 12 for the incoming cold gas. Similar tapered outlet ducts 13 for the emergence of the hot gas are formed between the outer walls of adjacent segments. As shown, in the longitudinal direction, the segments are bowed outwardly to form a generally spherical reactor. The segments become longer as the outer surface of the reactor is approached, the additional length being curved inwardly back toward the reactor axis in overlapping relation to the right end of the inwardly adjacent segment. In this manner, the outlet ducts 13 all merge into a main central coolant outlet channel 14.

In this case, the cold gas enters the reactor by way of inlet ducts 12 and thereafter traverses the porous active material which forms the walls of segments 11. The hot gas then emerges from the reactor by way of outlet ducts 13 and channel 14 and proceeds to the jet nozzle. It will be apparent that there is a natural increase in the gas passage area as the gas moves radially outward through the walls of segments 11. This increase in gas passage area is, of course, in the right direction to conform to the expansion of the gas as its temperature increases.

The porous structure which forms the reactor 2' could most readily be fabricated by first forming a single continuous polystyrene structure representing the voids, that is, the structure would conform in shape to the inlet ducts 12, outlet ducts 13, and channel 14. Around this structure, the moderator constituent of the active material, in granular or powdered form, would be cemented, utilizing a carbonaceous organic material as the binder. The structure would then be heated to a temperature sufficient to remove the polystyrene and the binder and to sinter the granular moderator. Heated air might then be forced through the remaining porous structure to burn out any remaining binder and remove tight places in the pores. Thereafter, the entire structure would be impregnated with the fissionable constituent, thereby forming the porous active structure, as shown in Fig. 3.

The power level of the nuclear reactors of both forms of the invention can be controlled by any of the various techniques of reactor control, such as the insertion of a variable length of a boron or cadmium control rod. Since such methods of reactor control are well understood by those skilled in the art, and since they form no part of the present invention, no particular type of control mechanism is illustrated in the drawings.

By utilizing the principles of the present invention, a compact nuclear reactor having extraordinarily good heat transfer characteristics may be realized. By virtue of the porous construction of the active material, the heat absorbing gas is enabled to approach very closely the actual points of origin of the heat, that is, the fissionable nuclei. In this manner, the length of the heat conduction path through the moderator constituent of the active material is materially reduced. Furthermore, the illustrated construction provides a multitude of parallel paths of gas flow through the active material, each of the paths being of a relatively short length. Thus, a huge volume of gas per second may be forced through the reactor without suffering an excessive pressure drop.

It is to be understood that all matter contained in the above description and examples are illustrative only and do not limit the scope of this invention as it is intended to claim the invention as broadly as possible in view of the prior art.

What is claimed is:

A nuclear reactor comprising a mass of material containing fissionable nuclei, said mass being formed as a plurality of tapered hollow tubular segments, each of said segments converging to a close at the apex of the taper, adjacent ones of said segments being interconnected at the opening of the taper, the walls of said tubular segments having gas passages therethrough whereby a coolant gas may be forced into the tapered opening of said segments, through said gas passages, and out the tapered opening formed between said segments.

No references cited.